No. 672,184. Patented Apr. 16, 1901.
E. W. CUSHING.
PHOTOMETER.
(Application filed July 13, 1900.)
(No Model.)
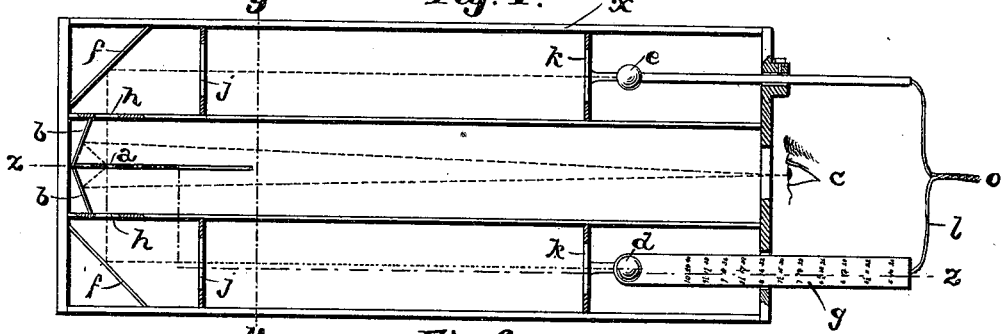
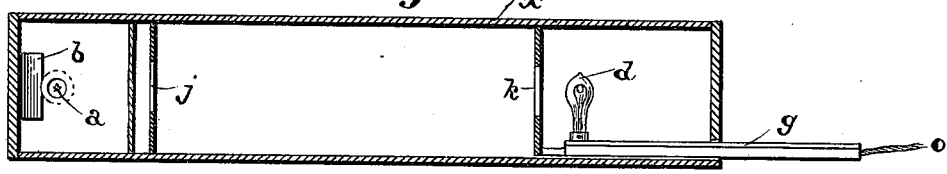
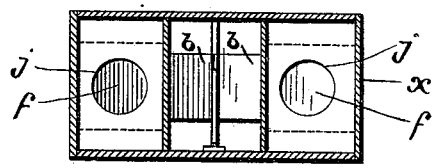
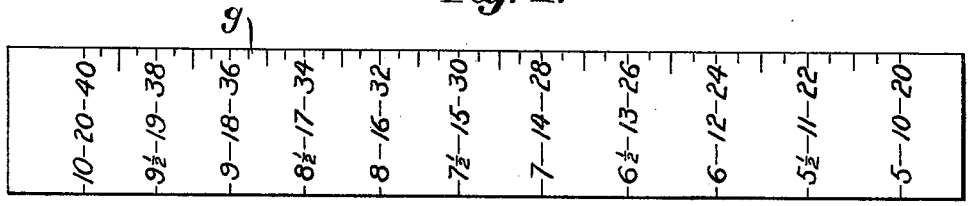
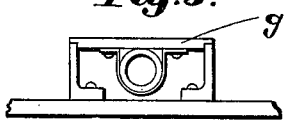
Witnesses:
Walter E Lombard
J. M. Jackson
Inventor
Ernest W. Cushing,
by Arthur P. Cushing
Atty.
THE NORRIS PETERS CO., PHOTO-LITHO., WASHINGTON, D. C.

UNITED STATES PATENT OFFICE.

ERNEST W. CUSHING, OF BOSTON, MASSACHUSETTS, ASSIGNOR TO EASTERN ELECTRIC COMPANY, OF SAME PLACE.

PHOTOMETER.

SPECIFICATION forming part of Letters Patent No. 672,184, dated April 16, 1901.

Application filed July 13, 1900. Serial No. 23,467. (No model.)

*To all whom it may concern:*

Be it known that I, ERNEST W. CUSHING, a citizen of the United States, and a resident of Boston, in the county of Suffolk and State of Massachusetts, have invented certain new and useful Improvements in Photometers, of which the following is a specification.

In measuring the amount of light emitted by a luminous body, as an incandescent electric lamp, it is customary to place the lamp to be measured at a distance of five feet or farther from a lamp which serves as a standard and in a straight line between them to put a disk of paper, in the center of which is a grease spot. The relative amount of light on each side of the grease spot is observed by the eye in a position at some distance from the line joining the two lamps through the grease spot by means of two mirrors, the whole forming the so-called "Bunsen carriage." This carriage, consisting of disk, grease spot, mirrors, and a blackened box, with apertures for the entrance of light on each side and for the eyes in front, is moved to the right or left on the line between the lamps until the images of the spot in the mirrors appear to be equally illuminated, when the relative amounts of light emitted by the standard and by the lamp to be tested are indicated by a pointer on a scale on the bar on which the carriage moves. Such an arrangement requires much space and is expensive, particularly when it is made portable, and has to be put together accurately and rigidly and set up in a room which must be dark and should have blackened walls.

I will now proceed to give a description of my improvement, in which the drawings form a part, in which—

Figure 1 is a plan view of my improved photometer with the cover removed. Fig. 2 is a sectional elevation of the same, the cutting plane being on line $z\,z$ on Fig. 1. Fig. 3 is a cross-sectional view taken on the line $y\,y$. Fig. 4 is a plan of the scale-slide. Fig. 5 is an end view of the latter, showing the tube bearing the cord.

By the introduction of two mirrors $f\,f$ at an angle in each case of forty-five degrees the light coming from the two lamps $d\,e$ is reflected to the grease spot $a$, so that the sources of light and the eye of the observer $c$ are brought near together, and the whole apparatus can be put in the box $x$, easily portable and blackened inside, thus saving weight, expense, and the need of a black-walled dark room. The carriage being in this case immovable, the scale is marked on a plate which is attached to one of the lamps and moves with it toward or away from the spot $a$. One method of constructing a photometer according to these principles is shown in the accompanying figures.

The box $x$, thirty-two by thirteen and one-fourth by six and one-half inches, inside measurement, is divided by two longitudinal partitions into a central space five inches wide and a space on each side four inches wide. At one end of the central space is a central partition ten inches long having an aperture at $a$, wherein is fixed a disk of white paper with a grease spot in its center. At $b\,b$ are two mirrors at such equal angles as to show reflections of the two sides of the disk and spot at $a$ to the eyes of the observer at $c$. At $f\,f$ are two mirrors set in planes perpendicular to the floor of the box and at an angle of forty-five degrees to the plane of the disk. At $j\,k$ are apertures in diaphragms sufficiently large to allow direct rays of light from the lamps $d\,e$ to shine on the disk by reflection from the mirrors $f\,f$, but sufficiently small to cut off confusing rays which are reflected from the surfaces of the walls of the box and the partitions in spite of their black surfaces. The sockets of the lamps $d\,e$ are attached to bars of wood running in grooves, so that the lamps can be moved forward and backward. In these bars may be tubes to carry the electrical connections, as shown, or the electrical connections may be by ordinary binding-posts and wiring in the box. On the upper surface of the bar carrying the lamp $d$ there is a scale $g$, divided so as to show a range of from five to ten candle power, ten to twenty candle power, and twenty to forty candle power. When the line $a\,f\,d$ is just twenty-six inches, the line on the scale "8," "16," "32" will be flush with the outside of the box. The terminals of the lamps are connected in multiple by flexible cords with a socket $o$, which can be attached to an incandescent-lamp bracket to supply current. In the circuit of the cord $l$, leading to the lamp $d$, there are the usual connections for a sliding resistance, a voltmeter, and an ammeter or wattmeter.

The method of using this photometer is as follows: The socket $o$ being connected with a source of current, a standard lamp $d$ of approximately the same candle-power as the lamp to be tested and with a voltage the same or lower than the voltage of the circuit is put into the socket $d$ and by the resistance introduced into $l$ the standard is brought to its exact voltage and made to give its rated candle-power—say eight, sixteen, or thirty-two. The bar bearing the lamp is then so placed that the rated candle-power of the lamp appears on the scale flush with the outside of the box. Another lamp of approximately the same candle-power is put in the other socket, and the bar carrying this lamp is moved in or out until the illumination of the two sides of the spot is exactly equal. The lamp at $e$ is then at the voltage of the circuit, giving to the spot the same amount of light as the standard lamp, and the lamp at $e$ thus becomes a standard for that voltage. The lamp at $d$ is then removed, the resistance is cut out at $l$, and the lamp to be tested is put in the socket $d$. By moving the lamp and the attached scale inward or outward until the illumination of the spot is equal on each side the candle-power of the lamp under test at the voltage of the circuit can be read on the scale flush with the outside of the box. Any slight variations of the voltage of the circuit affects both lamps equally and are therefore of little consequence. The watts consumed are read on the wattmeter or calculated from the reading of the ammeter in circuit at $l$. The lamp $d$ may be rotated by usual mechanism. (Not shown here.)

What I claim as my invention is—

1. In a photometer, having a white opaque disk, and a translucent spot thereon, with two mirrors, one on each side of said disk, and at such equal angles therewith as to reflect the image of said disk and of the translucent spot thereon, at each side, to the eyepiece of the photometer, which is in the plane of said disk and on a level therewith, and at a distance of about three feet therefrom, two more mirrors, one on each side, and at equal distance on each side, from said disk and spot, and in a plane in each case at an angle of forty-five degrees with the plane of said disk, and also at an angle of forty-five degrees with the direction of the source of light which illuminates said disk and spot, by reflection from said mirror, last mentioned.

2. In a photometer, having a white opaque disk, and a translucent spot thereon, with two mirrors, one on each side of said disk, and at such equal angles therewith as to reflect the image of said disk and of the translucent spot thereon, at each side, to the eyepiece of the photometer, which is in the plane of said disk and on a level therewith, and at a distance of about three feet therefrom, and two more mirrors, one on each side, and at equal distance on each side, from said disk and spot, and in a plane in each case at an angle of forty-five degrees with the plane of said disk, and also at an angle of forty-five degrees with the direction of the source of light which illuminates said disk and spot, by reflection from said mirror, last mentioned, a means of varying the distances of the source of illumination from the mirrors last mentioned, as follows: two sliding bars, to each of which one of the sources of illumination is attached, and each bar fixed in such a position that it may be moved forward and backward longitudinally, but is kept laterally in exactly the direction of a line having an angle of forty-five degrees with the plane of the mirror which reflects the light of that source of illumination onto the said disk and spot described.

In testimony whereof I have affixed my signature in presence of two witnesses.

ERNEST W. CUSHING.

Witnesses:
 CHAS. E. TODD,
 ARTHUR P. CUSHING.